March 23, 1971     J. G. LIVINGSTONE     3,572,413

CONTAINER AND SNAP-ON COVER

Original Filed Sept. 5, 1967     2 Sheets-Sheet 1

INVENTOR
JAY G. LIVINGSTONE

BY    *Gordon C. Mack*

ATTORNEY

March 23, 1971 J. G. LIVINGSTONE 3,572,413
CONTAINER AND SNAP-ON COVER

Original Filed Sept. 5, 1967 2 Sheets-Sheet 2

INVENTOR
J. G. LIVINGSTONE
BY
ATTORNEY

United States Patent Office 3,572,413
Patented Mar. 23, 1971

1

3,572,413
CONTAINER AND SNAP-ON COVER
Jay G. Livingstone, 715 W. Market St.,
Akron, Ohio 44303
Continuation of application Ser. No. 768,214, Oct. 11, 1968, which is a continuation of application Ser. No. 665,482, Sept. 5, 1967, which in turn is a continuation-in-part of application Ser. No. 545,676, Apr. 27, 1966. This application June 19, 1969, Ser. No. 866,404
Int. Cl. B65d 23/00, 41/16
U.S. Cl. 150—.5                                    13 Claims

ABSTRACT OF THE DISCLOSURE

A plastic container with an opening at the top and bulging inwardly adjacent its top, as in a neck or spout or the like is provided with a snap-on skirted cover, usually an ordinary cap but it may be a shaker top, etc. Different depending annular tongue means on the fitment are disclosed for pressing outwardly at the bulge of the fitment to enlarge and/or lengthen the spout and press it into sealing contact against either the skirt or top of the cover, or both. The container need not extend to the inside of the top of the cover.

This is a continuation of my application Ser. No. 768,214 filed Oct. 11, 1968 (now abandoned) which is a continuation of my application Ser. No. 665,482 filed Sept. 5, 1967 (now abandoned) which is a continuation-in-part of my application Ser. No. 545,676 filed Apr. 27, 1966 (now abandoned).

This invention relates to the assembly of a container and snap-on cover.

The container is provided at its top with an opening for introducing and dispensing a liquid or solid, usually at the top of a neck or spout although the diameter of the opening may be the same as the inside diameter of the bottom of the container. The entire container, or at least the portion immediately below the opening, is of flexible plastic. The cover is usually an ordinary snap-on cap, but it may be a shaker top, etc. It is usually of flexible resilient plastic but may be of a rigid composition.

The cover is provided with a skirt. It is placed over the opening and held in place by a snap-on bead and groove. There is an annular inward bulge in the container near its top. The bulge is in the portion of the container which is plastic if the entire container is not plastic. It is formed by the wall of the container slanting inward toward the bulge, both above and below the bulge. Pressure is maintained on the bulge by suitable annular tongue means which depends from the top of the cover. Various types of bulges and tongue means are shown in the accompanying drawings, all of which drawings relate to circular spouts and fitments and most of which show only a portion of the top of the container. Many show sections through only one side of the top of the container and cover, or a portion thereof. The container is usually a bottle, but may be a squeezable tube, etc.

Generally, the top of the container and cover will be made of a stiff, resilient plastic such as polyethylene (for example, medium-density grade rather than low or high density) although other plastics may be used with which a seal may be effected by pressure contact. The cover is easily removable. The neck or spout may be separate from the rest of the container, as is known in the art.

Although other covers may be used, the invention will be described more particularly as applied to a usual closure cap. Using a snap-on cover, as disclosed, the pressure of the tongue against the bulge in the container maintains pressure contact between the top of the container and the cover in those constructions in which the top of the container contacts the inside top of the cover. In such structures, the top of the container is thus sealed against the top of the cover. Because of the difficulty of maintaining the length of the neck or the like of many types of containers within close tolerances, it is often expedient to provide a space between the top of the container and the cover, and in this case the pressure on the bulge enlarges the top of the container into pressure contact with the skirt of the cover.

The assembly is particularly adapted for use in the utilization of containers in which downward and upward flexing of the top of a container are not necessary for engaging and releasing the cover, such as is required in structures described in my Patent 3,199,750. Wedges or the like may be provided above and/or below the top of the container where it joins the wall of the container (FIGS. 9 and 10) to prevent or limit such flexing.

Figure 1:
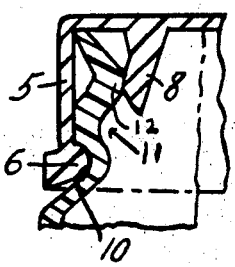
FIGS. 1 to 3 show a snap-on bead on the interior of a cover engaged in a groove in the outer wall of the neck of a container, with different structures for maintaining the neck and cover in pressure contact.

The closure cap 5 of FIG. 1 is provided with bead 6 around its bottom, and there is a flexible and resilient annular tongue 8 extending downwardly from its top. The groove 10 in the wall of the bottle neck 11 accommodates the bead 6. When the cap is snapped in place with bead 6 in groove 10, the tongue 8 exerts positive outward pressure against the bulge 12 in the neck. This enlarges and lengthens the neck, and its top is pressed into pressure contact with the cap at the juncture of its top and skirt. The bead 6 is easily flexed outward as the cap is engaged in the groove 10 of the neck, usually with some inward giving of the neck, and this also takes place when the cap is removed.

Figure 2A:
FIG. 2A is a detail of the cover shown in FIG. 2 before engagement with the container, with a dotted-line suggestion of the flexing of the tongue which occurs on engagement of the cover with the container.
Figure 2:
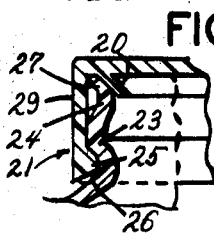

FIGS. 2 and 2A show a different tongue 20 on the cap 21, which is flexed inward as shown in FIG. 2, and as indicated in dotted lines in FIG. 2A, when the cap is engaged with bottle neck 23. The bead 25 is engaged in groove 26 when the cap is on the neck. The neck bulges inwardly at 24, above the groove and flares outwardly at its top 27. The outward pressure of tongue 20, aided by the confinement effected by the wall 29 of the cap, keeps the top of the neck in pressure contact against the cap, and particularly against its top.

Figure 3:
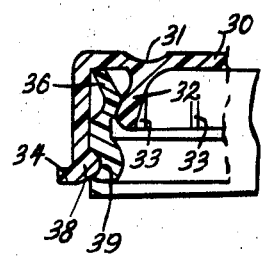

The cap 30 of FIG. 3 is similar to the cap of FIG. 2, except for the indentation 31 above the tongue 32 which facilitates its flexing, and the ribs 33 which stiffen the tongue. A small tab 34 is provided to facilitate removal of the fitment from the container. The tongue 32 is hooked under the inward bulge in the neck. The top 36 of the neck is pressed by the tongue 32 to hold it in a firm position so as to maintain pressure contact between its top and the top of the cap. The bead 38 on the neck is engaged in groove 39 in the outer wall of the neck.

Figure 4:
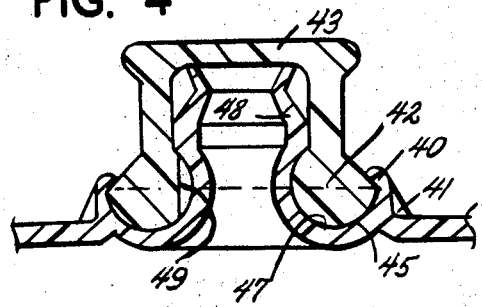
FIG. 4 is a section through the whole of a cover with a bead at its bottom engaged in a groove in the container.

In FIG. 4, lip 40, preferably but not necessarily stiffened by ribs 41, tends to engage the bead 42 at the bottom of the cap 43. The rounded outer undersurface 45 of the bead presses this lip 40 outward as the cap is placed on the container, and the lip closes over the bead after it is seated in the groove 47 in the container. There might be a tongue extending down from the top of the cap to tend to straighten the container 48 to insure pressure contact between it and the top of the cap.

At several places on the inner surface of bead 42 it is desirable to provide flat spots 49 or indentations which collect air as the cap 43 is being pressed over the neck 48 and release it upward just before the bead of the cap is seated in groove 47.

Figure 5:
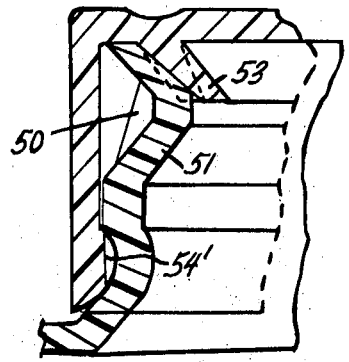
FIG. 5 is a modification of the assembly shown in FIG. 2.

The assembly of FIG. 5 is a modification of that illustrated in FIG. 2. It includes the rib 50 to stiffen neck 51. The flange 53 presses outwardly against the neck, tending to straighten it and thus maintain its top in pressure contact with the top of the cap.

Figure 5A:
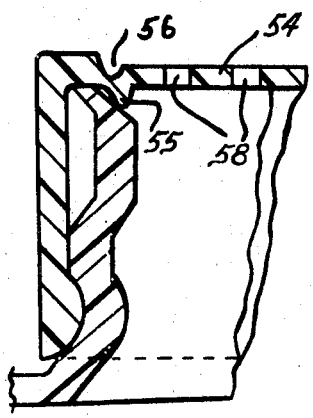
FIG. 5A is a shaker-top modification of the assembly shown in FIG. 5.
Figure 5B:
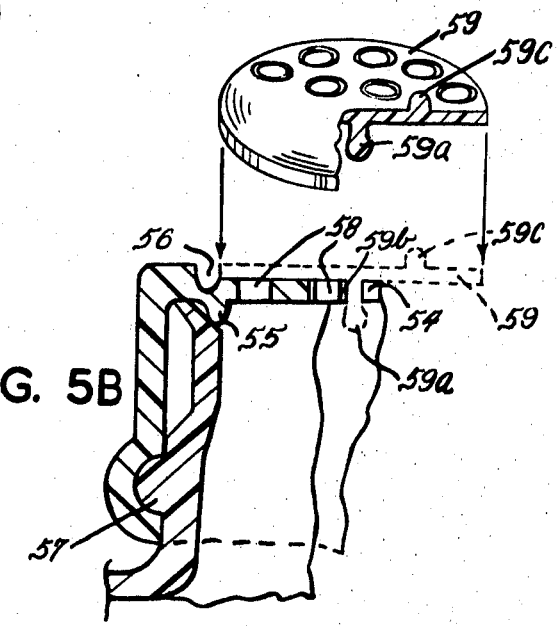
FIG. 5B is an exploded view of a modified shaker-top arrangement, showing a portion of the top lifted, and showing it also in dotted lines in position on the container.

In the modifications shown in FIGS. 5A and 5B the cover is provided with a shaker top 54. The annular tongue 55 of FIGS. 5A and 5B is shaped somewhat differently from the tongue 53 of FIG. 5, and indentation 56 is somewhat deeper than the indentation shown there. The indentation 56 is offset outwardly from tongue 55 to facilitate flexing the tongue 55 out into the corner of the cap. The cap in each of these views has a shaker top with openings 58 in one-half of the top.

In FIG. 5B, the interlocking of the wall of the cap and the neck is reversed because the circumferential bead 57 on the neck fits into a circumferential groove in the cover to pull the cover down and hold it in tight engagement with the top of the neck. This bead is advantageously flattened or depressed at several places 54' (FIG. 5) around its circumference for the same reason that bead 42 is deformed at 49 (FIG. 4). The openings 58 are concentrated in one-half of the top 54 of the cover. The element 59 with openings in half of it arranged in the same pattern as openings 58 is provided with projection 59a which is held in the opening 59b located centrally of the top 54, to provide for its rotation. The projection 59c which extends upwardly from element 59 is used to assist in such rotation so as to register the openings in the top 54 and element 59 when the contents of the container are to be shaken out, and to close the openings 58 in the top 54 by the blank half of element 59 when this is desired.

Figure 6:
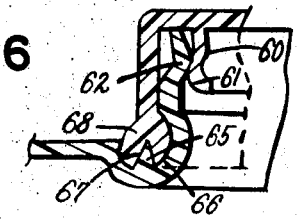
FIG. 6 illustrates a different type of engagement of the bead on the bottom of a cover with a groove in a container.

In FIG. 6, the tongue 60 is of substantially uniform thickness and can readily snake itself out of the mold in which it is formed. The bulge 61 in the tongue cooperates with the inward bulge 62 of the neck to tend to straighten the neck and maintain pressure contact between the top of it and the cover. The wedge 65 which extends into the groove 66 widens at a greater angle than the groove 67 in the bead 68, so that as the cover is pressed over the neck, the bead 68 is broadened to make a tight fit in the groove 66.

Figure 7:
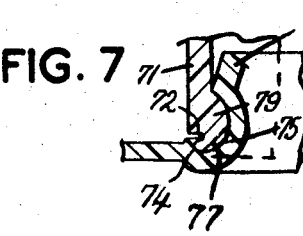
FIGS. 7 and 8 are modifications of the assembly shown in FIG. 6.

In the assembly illustrated in FIG. 7, the bead 79 on the cap 71 is notched at 72, and there is an abutment 74 in the groove 75 in the container. The space between the abutment 74 and the wall of the groove is smaller than the projection 77 which fits into it, so that when the fitment is pressed over the spout 78 the projection 77 makes a tight fit in the groove.

Figure 8:
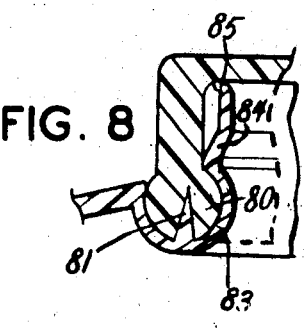

Comparing the assembly of FIG. 8 with that shown in FIG. 6, it will be noted that the bead 80 is more rounded. The wedge 81 spreads the bead as it enters the groove 83, causing the bead to make a tight fit in the groove 83. The top 85 of the neck 84 is bent outward and makes sealing contact with the cover as it is held against it by the tight engagement of the bead 80 in the groove 83.

Figure 9:
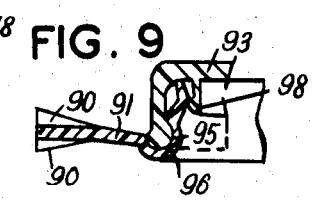
FIGS. 9 and 10 are different views of a cover on a container with the cover engaged in a groove in the container.

In FIG. 9, the webs 90 fit between the top 91 of the container and its side wall (not shown) and resist flexing of the top as pressure is applied when the cap 93 is pressed over the neck. The lower web 90 is not needed on blown plastic bottles. The top 91 of the container is depressed by pressure on the cover and the bead 95 is held in the groove 96. The flange 98 tends to straighten the neck and maintain its top in pressure contact with the cover. Although webs 90 prevent flexure of the top adjacent the wall of the container, the top may flex between the webs 90 and groove 96, as shown.

Figure 10:
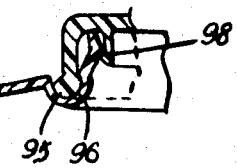

In FIG. 10, the pressure on the cover has been relieved and the groove 96 does not wrap around the bead 95, as shown in FIG. 9, so that the cover can be readily lifted off of the container.

Figure 11:
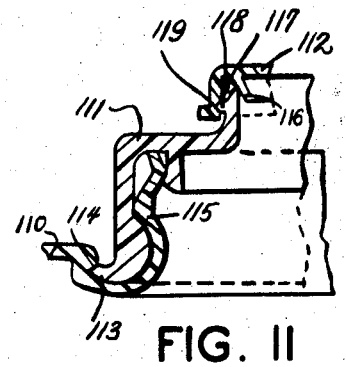
FIG. 11 illustrates a three-part assembly embodying improvements of this invention.

The assembly of FIG. 11 includes container 110, a first fitment 111 and a second fitment or cover 112, all preferably made of plastic, although the cover 112 may be of metal, glass or other rigid construction material. The bead on the first fitment is provided with a projection 113 which fits under lip 114 on the top of the container when the first fitment is pressed over the neck 115 of the container. The tongue 116 of the second fitment is preferably flexible and functions in the manner of the tongue illustrated in FIGS. 2 and 2A to keep the bulge in the neck under pressure so that its top presses against the inner surface of the cover. The top of the neck of the first fitment is bulged in at 117 near its top to make it non-dripping. The tongue on fitment 111 presses it into contact with the top of the fitment. The bead 118 below groove 117 is engaged in the groove 119 in the inner surface of the depending edge of fitment 112. When this fitment is placed over the first fitment 111, bead 118 becomes engaged in groove 119 maintaining the top of this neck in pressure contact with the second fitment. This second fitment may be a shaker top or it may be formed with a spout, etc.

Figure 12:
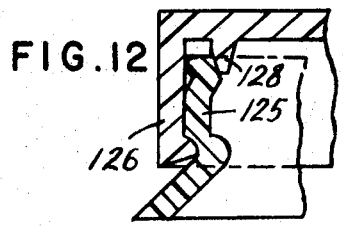
FIG. 12 illustrates an assembly in which there is a space between the top of the container and the cover and a seal is maintained between the container and the skirt of the cover.

In FIG. 12, the top of the neck 125 does not contact the inside top of the cap 126. Thus it is not necessary to hold the length of the neck within close tolerances. The tongue 128 presses outward on the bulge of the neck, when the cap is snapped in place, pressing the top of the spout into sealing contact with the inside of the skirt of the cap.

In most cases the lip of the neck or spout is thin as at 36 in FIG. 3, so that when the snap-on bead seats, this lip can flex and/or it may flex at the juncture as shown at 62 in FIG. 6.

The effect of pressure on the bulge will depend upon the direction in which the top of the neck can move. If the top of the neck is already touching the top of the cap the pressure will force the neck outwardly and enlarge it. If there is a space between the top of the neck and the top of the cap, the pressure on the bulge must be such as to push the top of the neck outwardly to bring it into sealing contact with the skirt of the cap.

Although the drawings show a tongue of a sort extending from the top of the cover to apply pressure to the inner surface of the bulge in the container, it is to be understood that instead of a tongue, the top of the cover may be dished to provide such pressure.

The invention is covered in the claims which follow.

I claim:

1. The assembly of (1) a container with a resilient neck the upper portion of which is plastic, the neck having an opening in the top, and (2) a snap-on cover with a skirt, which cover is over said top, the inner and outer surfaces of the plastic wall of the neck slanting into a bulge and then slanting out, an annular tongue in the cover which depends from the top thereof with the neck between the skirt and the tongue, and with the tongue in pressure contact with the neck adjacent said bulge and lengthening or enlarging the neck to press the same against the cover with the upper surface of the outwardly slanting wall of the neck immediately above the innermost portion of the bulge exposed from above to be contacted by the tongue when the cover is placed on the container.

2. The assembly of claim 1 in which the top of the neck is not in contact with the top of the cover.

3. The assembly of claim 1 in which the pressure of the tongue against the neck maintains the top of the neck in pressure contact with the cover.

4. The assembly of claim 1 in which the cover is of resilient plastic.

5. The assembly of claim 1 in which the top edge of the neck is in pressure contact with the skirt.

6. The assembly of claim 1 in which there are substantially vertical ribs on the inner surface of the tongue which stiffen it.

7. The assembly of claim 1 in which there is a bead around the bottom of the skirt and an inwardly directed lip on the container below the neck, which bead forces the lip outward as the cover is placed on the container and said lip closes over the bead when the cover is seated on the container.

8. The assembly of claim 1 in which the bottom of the bead is indented circumferentially and a wedge projects up from the container which is seated in the indentation and spreads the bead against the lip and neck.

9. The assembly of (1) a container with a neck the upper portion of which is plastic and an opening in the top, and (2) a snap-on cover with a skirt, which cover is over said top, in which assembly the top edge of the neck is not in contact with the cover, an annular tongue in the cover depends from the top thereof, with the neck between the skirt and the tongue, the inner and outer surfaces of the plastic wall of the neck slanting in and out to an inward bulge in the neck, with the upper surface of the outwardly slanting wall of the neck immediately above the bulge exposed from above to be contacted by the tongue when the cover is placed on the container, and with the tongue in pressure contact with the neck adjacent the innermost portion of the bulge.

10. The assembly of (1) a container with an opening in the top, and (2) a snap-on cover with a skirt, which cover is over said top, the inner and outer surfaces of the plastic wall of the neck slanting in and out to an inward bulge in the container near its top, and an annular tongue in the cover which depends from the top thereof and is in pressure contact with the inner surface of the container adjacent said bulge and lengthening or enlarging the neck to press the same against the cover, with the upper surface of the outwardly slanting wall immediately above the bulge exposed from above to be contacted by the tongue when the cover is placed on the container.

11. The assembly of claim 10 in which the cover is of resilient plastic.

12. The assembly of claim 10 in which the container terminates upwardly in a neck which is in pressure contact with the top of the cover.

13. The assembly of claim 10 in which the container terminates upwardly in a neck the top of which is out of contact with the top of the cover and is in pressure contact with its skirt.

References Cited

UNITED STATES PATENTS

| | | | |
|---|---|---|---|
| 3,080,090 | 3/1963 | Young | 150—.5X |
| 3,189,071 | 6/1965 | Balkema | 215—41X |
| 3,189,072 | 6/1965 | Starr | 150—.5 |
| 3,199,750 | 8/1965 | Livingstone | 220—60X |
| 3,204,799 | 9/1965 | Hunter | 215—41X |
| 3,216,610 | 11/1965 | Klygis | 150—.5X |
| 3,352,448 | 11/1967 | Livingstone | 215—41X |
| 3,375,047 | 3/1968 | Townsend | 150—.5X |
| 3,441,161 | 4/1969 | Van Baarn | 215—41X |

FOREIGN PATENTS

| | | | |
|---|---|---|---|
| 1,150,059 | 7/1957 | France | 215—(Fin) |

DONALD F. NORTON, Primary Examiner

U.S. Cl. X.R.

215—31, 40, 41